United States Patent
Iwase

(10) Patent No.: US 8,656,031 B2
(45) Date of Patent: Feb. 18, 2014

(54) DIALOG COMMUNICATION SYSTEM, DIALOG COMMUNICATION METHOD AND DIALOG COMMUNICATION PROGRAM

(75) Inventor: Toshio Iwase, Tokyo (JP)

(73) Assignee: NEC Corporation, Tokyo (JP)

( * ) Notice: Subject to any disclaimer, the term of this patent is extended or adjusted under 35 U.S.C. 154(b) by 271 days.

(21) Appl. No.: 12/863,098

(22) PCT Filed: Jan. 13, 2009

(86) PCT No.: PCT/JP2009/050319
§ 371 (c)(1),
(2), (4) Date: Jul. 15, 2010

(87) PCT Pub. No.: WO2009/090940
PCT Pub. Date: Jul. 23, 2009

(65) Prior Publication Data
US 2011/0055410 A1 Mar. 3, 2011

(30) Foreign Application Priority Data
Jan. 16, 2008 (JP) ................................. 2008-006887

(51) Int. Cl.
*G06F 15/16* (2006.01)
(52) U.S. Cl.
USPC ........................................ 709/228; 709/227
(58) Field of Classification Search
USPC ............................................... 709/227, 228
See application file for complete search history.

(56) References Cited

U.S. PATENT DOCUMENTS 7,555,108 B2 * 6/2009 Sylvain .................... 379/207.02
8,145,717 B2 * 3/2012 Mason et al. ................. 709/206

FOREIGN PATENT DOCUMENTS

| JP | 2004-318513 | 11/2004 |
|---|---|---|
| JP | 2005-057709 | 3/2005 |
| JP | 2005-284345 | 10/2005 |
| JP | 2005-284495 | 10/2005 |
| JP | 2005-309500 | 11/2005 |
| JP | 2006-094379 | 4/2006 |
| JP | 2006-172393 | 6/2006 |
| JP | 2007-026016 | 2/2007 |
| JP | 2007-251416 | 9/2007 |

OTHER PUBLICATIONS

Day, M. et al, "A Model for Presence and Instant Messaging", RFC2778, Feb. 2000, <http:www.letf.org/rfc/rfc2778.txt>, pp. 1-17.
International Search Report dated Apr. 7, 2009.

* cited by examiner

*Primary Examiner* — Adnan Mirza
(74) *Attorney, Agent, or Firm* — Scully, Scott, Murphy & Presser PC

(57) ABSTRACT

A computer terminal is provided with a contact list memory means that stores a contact list to describe registered users; a presence information control means that receive from, or deliver to, other computer terminals a request to register or delete the user described in the contact list; a contact list management means that receives from, or deliver to, the other computer terminals the request to register or delete the user described in the contact list and does not complete the registration or deletion of the user in the contact list until receiving a response from the other computer terminals; and a communication control means that carries out the disclosure of presence information indicative of the existence, non-existence or the like of the user only with the user registered in the contact list and dialog communication.

21 Claims, 14 Drawing Sheets

BACKGROUND ART

DIALOG COMMUNICATION SYSTEM, DIALOG COMMUNICATION METHOD AND DIALOG COMMUNICATION PROGRAM

TECHNICAL FIELD

The present invention relates to a system, a method, and a program for interactive communications using the presence technology, and more particularly to a system, a method, and a program for enabling interactive communications with only a party with whom quick dialogue is necessary.

BACKGROUND ART

There has been an interactive communication system using presence technology, generally known as an instant messaging system, for exchanging text or the like with a certain partner. The interactive communication system using presence technology will be described below with reference to FIG. 1.

As shown in FIG. 1, computer terminals 11A, 11B comprise means for sending presence information (hereinafter referred to as presentities 111A, 111B), means for receiving the presence information of the presentities (hereinafter referred to as watchers 112A, 112B), means for transferring the presence information of the presentities to watchers 112A, 112B (hereinafter referred to as presence service 21), means for sending instant messages (hereinafter referred to as senders 113A, 113B), means for receiving instant messages (hereinafter referred to as instant inboxes 114A, 114B), means for transferring an instant message from sender 113A or sender 113B to instant inbox 114A or to instant inbox 114B (hereinafter referred to as instant message service 31), screen output means 115A, 115B for outputting information to screens, and input means 116A, 116B for entering information from users. The present invention referred to above comprises information representative of the states of devices such as computer terminals 11A, 11B, etc. or the states of the users. For example, the present invention comprises information such as "online" or "offline" indicative of whether or not a device is connected to the network, and "available" or "unavailable" indicative of whether or not a user is able to respond immediately.

The interactive communication system using the presence technology, which is constructed above, operates as follows: When user A is desirous of the disclosure of the presence information of user B, watcher 112A which is instructed by user A though input means requests presence service 21 to disclose the presence information of user B. Presence service 21 which has received the request sends an inquiry to presentity 11B of user B or makes a judgement about the request according to a method such as by following a policy stored by present service 21 itself. When the request is permitted by user B, the presence information of user B will subsequently be transferred via presence service 21 to user A.

For sending an instant message from user A to user B, sender 113A which is instructed by user A though input means 116A sends an instant message for user B to instant message service 31. The instant message is then transferred from instant message service 31 to instant inbox 114B of user B.

According to the interactive communication system using the presence technology, it is customary for a user to register a companion user with whom instant messages are to be exchanged in a member list displayed on the screen (hereinafter referred to as a contact list). Based on the contact list, the user can confirm the presence information of the companion user and sends an instant message to the companion user. Generally, when a user is registered in the contact list, the user is notified of the fact that the user has been registered in the contact list by the other user.

Interactive communication systems using the presence technology include an interactive communication system which operates to complete the registration of a companion user in the contact list and confirm the presence information of the companion user after the companion user has given permission about the disclosure of presence information of the companion user, and an interactive communication system which operates to immediately complete the registration of a companion user in the contact list and confirm the presence information of the companion user without the need for permission from the companion user. According to the interactive communication system which completes the registration of a companion user after being permitted by the companion user, it is general practice for the companion user to select "permit" or "refuse" about disclosure of the presence information when the companion user confirms the notification on the screen of the computer terminal.

Another interactive communication system using presence technology allows the companion user to select "permit" or "refuse" as regards the reception of an instant message, in addition to the selection of "permit" or "refuse" as regards the disclosure of the presence information.

According to the interactive communication systems using presence technology, furthermore, when a companion user confirms that a certain user has registered the companion user in the contact list of the user, the companion user can select whether or not to register the user in the contact list of the companion user. Unless the companion user selects "register", the user is not registered in the contact list of the companion user.

Examples of the interactive communication systems using presence technology are disclosed in JP No. 2005-309500A (pages 3 through 5, FIG. 5) and Document: M. Day et al, "A Model for Presence and Instant Messaging", RFC2778, February 2000, <http:www.letf org/rfc/rfc2778.txt>.

With the interactive communication systems using presence technology, however, a process of permitting disclosure of the presence information to a companion and a process of registering a companion who has permitted disclosure of the presence information in a contact list are independent of each other, and users do not necessarily mutually permit the disclosure of the presence information and register a companion user in the contact list. For example, user A may register user B in the contact list, whereas user B may not register user A.

As a result, a user who has already been registered in the contact list may refuse the disclosure of the presence information or may refuse the reception of an instant message, and a user who has not been registered in the contact list may permit the disclosure of the presence information or may permit the reception of an instant message.

This is because the registration in the contact list, the permission of the disclosure of the presence information, and the permission of the reception of an instant message are not managed in a set, and all users who have permitted the disclosure of the presence information and all users who have permitted the reception of an instant message cannot be confirmed from only the contact list.

In addition to the above problem in which registration in the contact list, permission of the disclosure of the presence information, and permission of the reception of an instant message are not managed in a set, since users do not necessarily mutually permit the disclosure of the presence information and the reception of an instant message, there is a problem in that all users who have permitted the disclosure of the presence information and all users who have permitted the reception of an instant message cannot be confirmed from only the contact list. As a result, the presence information may be disclosed to a user who has not been registered in the contact list or an instant message may be received from a user who has not been registered in the contact list.

DISCLOSURE OF THE INVENTION

The present invention has been made in view of the above problems. It is an object of the present invention to provide an interactive communication system which is capable of exchanging presence information, exchanging instant messages, and exchanging other mediums with limited users who have mutually been registered in the contact lists of computer terminals which communicate with each other.

To solve the above problems, an interactive communication system using the presence technology according to the present invention includes a plurality of computer terminals connected to a presence service server and a communication service server through a network, the computer terminals having respective contact lists of communicable users, for performing communications between computer terminals belonging to users registered in the contact lists via the network, the presence service server, and the communication service server, wherein each of the computer terminals comprises contact list storage means for storing a presence disclosure state table representative of whether presence information indicating the availability or unavailability of the user is to be disclosed to another user, and also for storing the contact list, presence information control means for exchanging a request for registering or deleting a user in the contact list with another computer terminal via the presence service server, contact list managing means for managing the contact list and the presence disclosure state table, exchanging the request for registering or deleting a user in the contact list to the other computer terminal via the presence information control means, waiting for a response to the request from the other computer terminal, and completing the registration or deletion of the user in the contact list, and communication control means for disclosing the presence information to and performing interactive communications with only the users registered in the contact list.

To solve the above problems, an interactive communication method using the presence technology according to the present invention is carried out in a system including a plurality of computer terminals connected to a presence service server and a communication service server through a network, the computer terminals having respective contact lists of communicable users, for performing communications between computer terminals belonging to users registered in the contact lists via the network, the presence service server, and the communication service server, wherein each of the computer terminals comprises the step of inputting information of a user registered in the contact list, the step of sending a registration request to the computer terminal of the user, the step of waiting for a response from the computer terminal of the user, the step of completing registration of the user in the contact list if a response representative of "permitted" is obtained from the computer terminal of the user, and the step of sending a response representative of "permitted" to the user if a request for registering the user in the contact list is received from the computer terminal of the user.

To solve the above problems, a program using the presence technology according to the present invention enables a computer to carry out a communication process for performing communications with another computer terminal through a network, a contact list storing process for storing a contact list of registered users and a presence disclosure state table recording therein a state concerning the disclosure of presence information indicating the availability or unavailability of each of the users, a contact list managing process for managing the contact list storing process, a presence information control process for exchanging a request for registering or deleting a user in the contact list with the other computer terminal, a communication control process for disclosing the presence information to and performing interactive communications with only those users registered in the contact list, a screen output process for providing output screen data to the users, and an input process for inputting information from the users.

According to the present invention, the contact list managing means exchanges a request for registering or deleting a user in the contact list with the other computer terminal via the presence information control means, waits for a response to the request from the other computer terminal, and completes registration or deletion of a user in the contact list. The communication control means discloses the presence information and performs interactive communications with only those users registered in the contact list. The interactive communication system thus exchanges the presence information, exchanges instant messages, and exchanges other mediums with limited users registered mutually in the contact lists of the computer terminals which communicate with each other.

BEST MODE FOR CARRYING OUT THE INVENTION

The best mode for carrying out the invention will be described in detail below with reference to the drawings.

First Exemplary Embodiment

Figure 1:
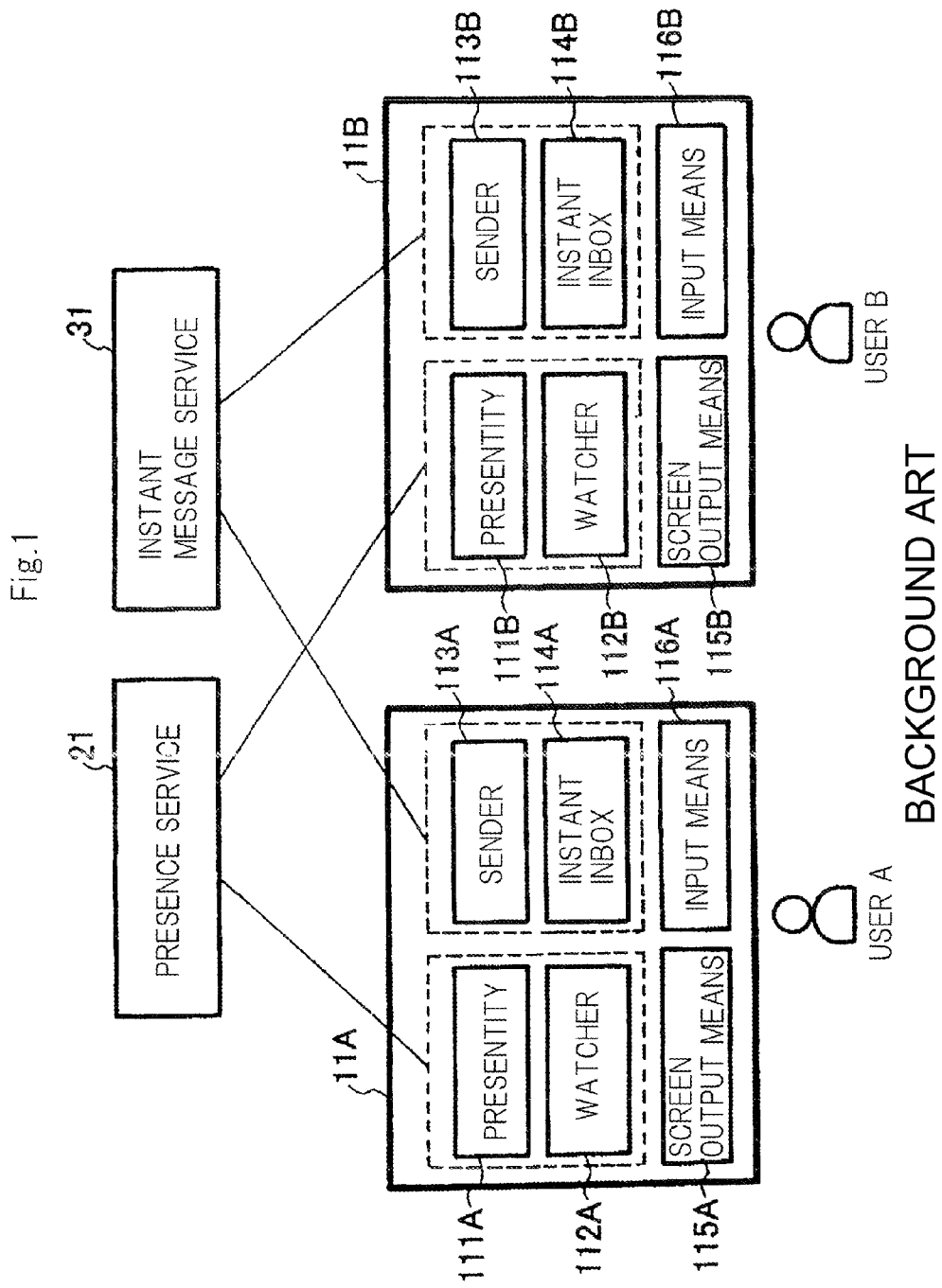
FIG. 1 is a block diagram showing the system configuration of an interactive communication system according to the background art.
Figure 2:
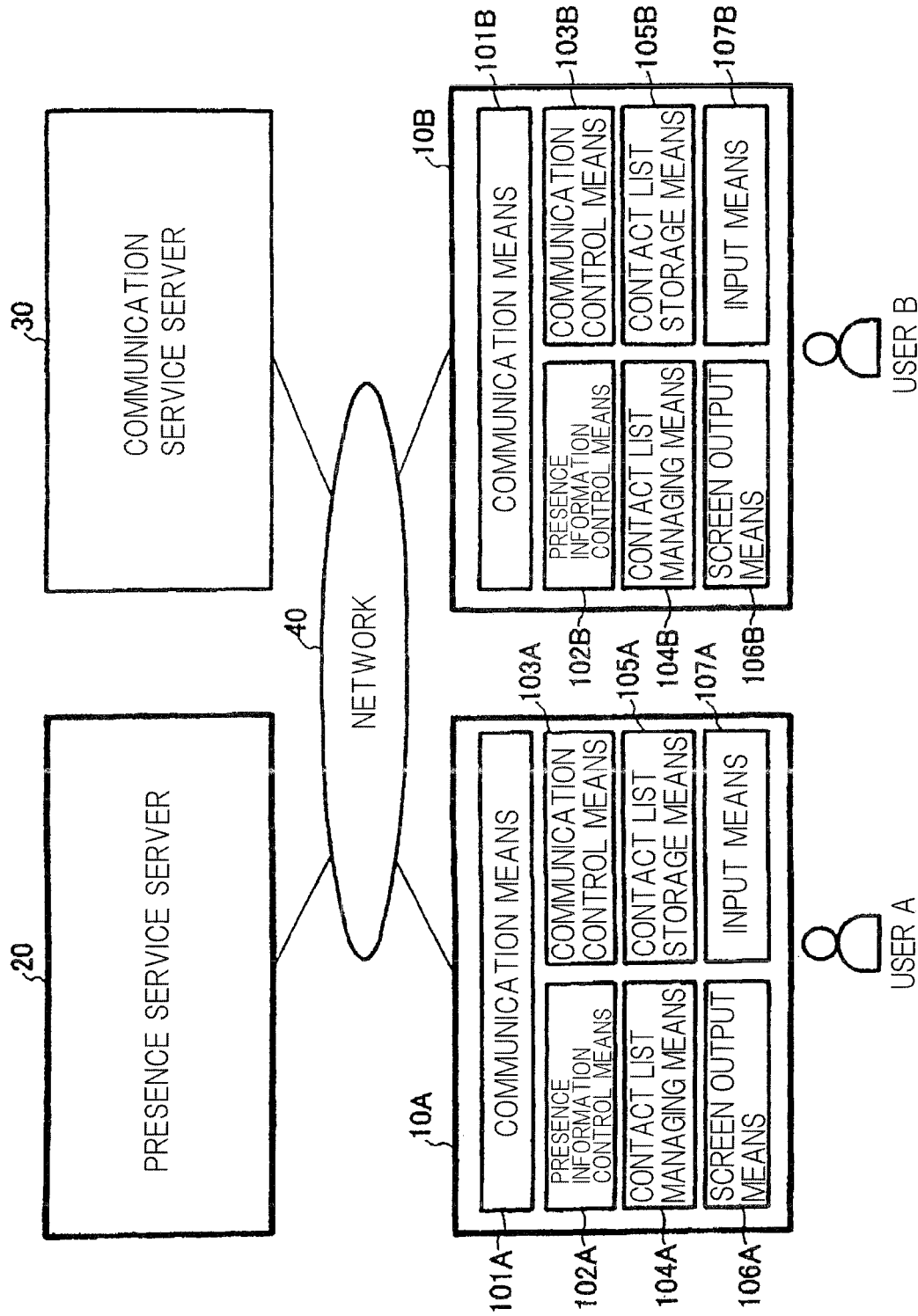
FIG. 2 is a block diagram showing the system configuration of an interactive communication system according to a first exemplary embodiment of the present invention.

FIG. 2 is a block diagram showing the system configuration of an interactive communication system according to a first exemplary embodiment of the present invention.

As shown in FIG. 2, the interactive communication system according to the present exemplary embodiment comprises computer terminals 10A, 10B which operate under program control, presence service server 20, communication service server 30, and network 40. Though the present exemplary embodiment is not limited to two computer terminals, the two computer terminals will be described for illustrative purposes.

Computer terminal 10A includes communication means 101A, presence information control means 102A, communication control means 103A, contact list managing means 104A, contact list storage means 105A, screen output means 106A, and input means 107A. Specifically, computer terminal 10A is not limited to a PC (Personal Computer), but may be a telephone, a mobile phone, a PDA (Personal Digital Assistant), a game machine, a display with a built-in computer, or the like. Computer terminal 10B is identical to computer terminal 10A, and hence its description will be omitted.

The above means generally operate as follows: Communication means 101A communicate with presence service server 20, communication service server 30, and computer terminal 10B via network 40. For communicating with presence service server 20, communication means 101A uses SIP (Session Initiation Protocol), SIMPLE (SIP for Instant Messaging and Presence Leveraging Extensions), XMPP (eXtensible Messaging and Presence Protocol), or HTTP (Hypertext Transfer Protocol), for example. For communicating with communication service server 30, communication means 101A uses SIP (Session Initiation Protocol), XMPP (eXtensible Messaging and Presence Protocol), or HTTP (Hypertext Transfer Protocol), for example.

Presence information control means 102A exchanges information about presence information with presence service server 20 via communication means 101A.

Communication control means 103A interactively communicates with computer terminal 10B to exchange various mediums including text, audio data, still images, moving images, electronic files, etc. using communication service server 30 via communication means 101A.

Contact list managing means 104A manages a contact list and a presence disclosure state table that is indicative of whether or not the presence information of user A is to be disclosed to other users.

Contact list storage means 105A stores the contact list and the presence disclosure state table.

Screen output means 106A provides output data to the screen, and input means 107A makes it possible to enter information from user A.

Overall operation of the interactive communication system according to the present exemplary embodiment will be described in detail below with reference to FIGS. 3 through 10.

Figure 3:
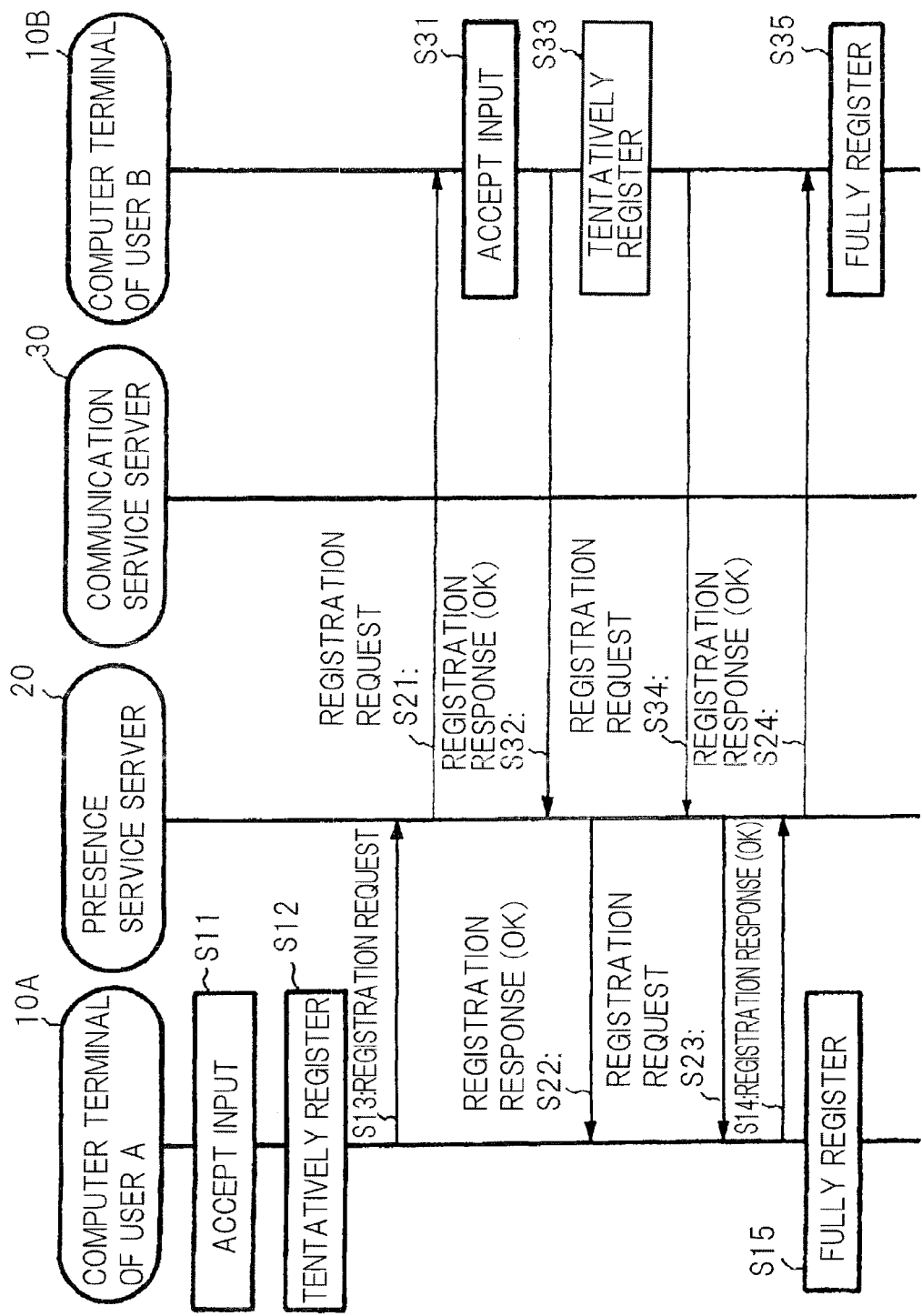
FIG. 3 is a sequence diagram of a process of registering a user in a contact list according to the first exemplary embodiment.

FIG. 3 is a sequence diagram of a process of registering a user in a contact list according to the first exemplary embodiment. In FIG. 3, computer terminal 10A accepts the input of an action for registering user B in the contact list (S11). Then, computer terminal 10A tentatively registers user B (S12). Specifically, an action to register user B in the contact list is made via input means 107A, and contact list managing means 104A changes "presence disclosure state with user B" in the presence disclosure information table stored in contact list storage means 105A from "initial state" to "confirming state".

Figure 4:
FIG. 4 is a diagram showing an example of a presence disclosure information table according to the first exemplary embodiment.

FIG. 4 is a diagram showing an example of the presence disclosure information table which is stored in contact list storage means 105A, 105B. Presence disclosure information table 500 shown in FIG. 4 includes users in "initial state". However, users in "initial state" may not be included in presence disclosure information table 500, but may be added when they are changed to a state other than "initial state".

Computer terminal 10A sends "registration request" for user B to presence service server 20 (S13). Specifically, presence information control means 102A sends the "registration request" for user B to presence service server 20 via communication means 101A.

Presence service server 20 transfers the received "registration request" to computer terminal 10B of user B (S21).

Computer terminal 10B which has received the "registration request" issued from computer terminal 10A displays on the screen a message indicating that there is a registration request from user A for registration in the contact list. Computer terminal 10B accepts an input from user B with respect to a selection as to whether or not the registration request is to be permitted (S31). Specifically, presence information control means 102B receives the "registration request" via communication means 101B and controls screen output means 106B to let user B know that there is a registration request from user A and to display a screen for prompting user B to select whether or not the "registration request" is to be permitted.

If user B selects "permit" on the screen, computer terminal 10B accepts an input concerning the selection, and returns "registration response (OK)" to presence service server 20 (S32). Specifically, input means 107B sends a message indicating that "permit" is selected to presence information control means 102B, which returns "registration response (OK)" to presence service server 20 via communication means 101B.

Presence service server 20 transfers the received "registration response (OK)" to computer terminal 10A (S22).

After returning the "registration response (OK)" to presence service server 20, computer terminal 10B of user B tentatively registers user A (S33). Specifically, contact list managing means 104B changes "presence disclosure state with user A" stored in contact list storage means 105B to "confirming state".

Computer terminal 10B also sends "registration request" seeking the permission of registration of user A in the contact list to presence service server 20 (S34). Specifically, presence control means 102B returns "registration request" for user A to presence service server 20 via communication means 101B.

Presence service server 20 transfers the received "registration request" to computer terminal 10A of user A (S23).

When computer terminal 10A of user A receives the "registration response (OK)" (S22) and the "registration request" (S23) from presence service server 20, computer terminal 10A returns "registration response (OK)" to the "registration request" (S23) to presence service server 20 without any action of user A (S14). Specifically, when presence control means 102A receives the "registration response (OK)" and the "registration request" via communication means 101A, presence information control means 102A automatically returns "registration response (OK)" to the "registration request" to presence service server 20 via communication means 101A.

Then, computer terminal 10A fully registers user B (S15). Specifically, contact list managing means 104A changes the "presence disclosure state with user B" stored in contact list storage means 105A from the "confirming state" to "permitted state". Then, contact list managing means 104A registers and stores user B in the contact list stored in contact list storage means 105A.

Presence service server 20 transfers the received "registration response (OK)" to computer terminal 10B of user B (S24).

When computer terminal 10B of user B receives the "registration response (OK)", computer terminal 10B fully registers user A (S35). Specifically, after presence information control means 102B receives the "registration response (OK)", contact list managing means 104B changes the "presence disclosure state with user A" stored in contact list storage means 105B from "confirming state" to "permitted state". Contact list managing means 104B registers and stores user A in the contact list stored in contact list storage means 105B.

Until the full registration (S15) is finished, i.e., until user B is registered in the contact list, computer terminal 10A of user A does not display the presence information of user B on the screen. Similarly, computer terminal 10B of user B does not display the presence information of user A on the screen.

In FIG. 3, the tentative registration (S12) and the sending of the "registration request" (S13) may be switched around. The tentative registration (S33) and the sending of the "registration request" (S34) may also be switched around. The sending of the "registration response (OK)" (S14) and the full registration (S15) may also be switched around. Switching these steps around may only result in a change in a process to be performed if an error occurs in the sequence for some reasons.

In FIG. 3, presence service server 20 may judge the "registration request" (S13, S34) as NG according to a policy established in presence service server 20, and return "registration request (NG)" to the source of the "registration request", without transferring the "registration request" to the destination user. If presence service server 20 judges the "registration request" in S13 as NG, then a rollback process for canceling the tentative registration (S12) is performed. Similarly, if presence service server 20 judges the "registration request" in S34 as NG, then a rollback process for canceling not only the tentative registration (S33), but also the tentative registration (S12) is performed.

In FIG. 3, if user B selects "not permitted" (S31) in response to the "registration request" issued from user A, then computer terminal 10B accepts an input about the selection and performs a rollback process for changing the "presence disclosure state with user B" in computer terminal 10A from the "confirming state" back to the "initial state". Since the process for user A to register user B in the contact list is reverted to the state prior to the action to start the process, user A can repeat the action to register user B in the contact list (S11).

In this manner, user B is registered in the contact list of user A, and user A is registered in the contact list of user B. The interactive communication system operates for both the users to register each other in their contact lists. If either one of the users does not want to be registered in the contact list, they are not registered in either of the contact lists.

If user A interactively communicates with other users, then computer terminal A operates to perform interactive communications with only those users who are registered in the contact list. Specifically, screen output means 106A and input means 107A operate to designate only the users who are registered in the contact list as companions for interactive communications. Communication control means 103A confirms whether or not a companion for interactive communications is registered in the contact list stored in contact list storage means 105A, through contact list managing means 104A. If a companion for interactive communications is not registered in the contact list, then communication control means 103A does not perform interactive communications with the companion. When computer terminal 10A receives interactive communications from another user, communication control means 103A confirms whether or not the source user is registered in the contact list, and allows only incoming calls from registered users to pass to user A.

Figure 5:
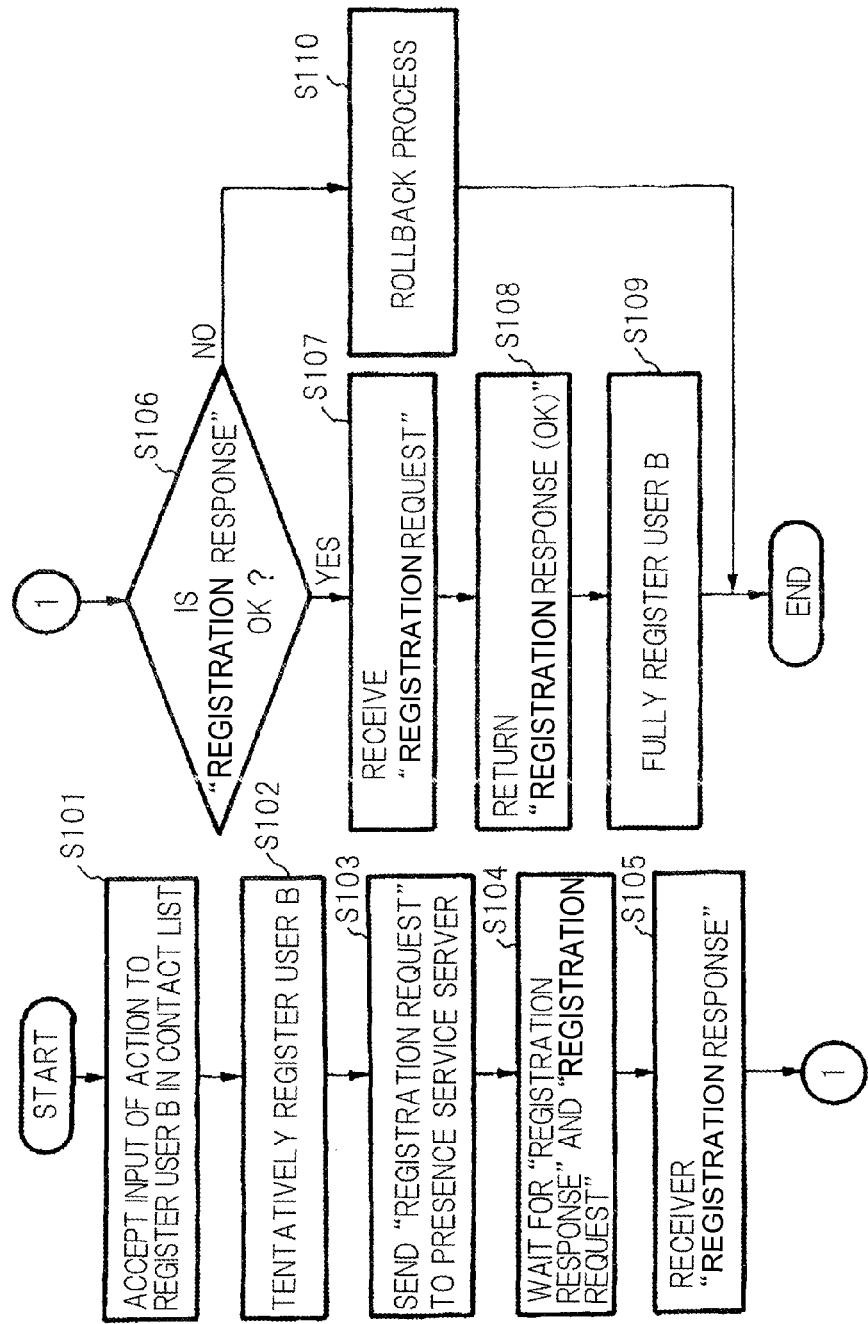
FIG. 5 is a flowchart of an operation sequence of a computer terminal in the process of registering a user in a contact list according to the first exemplary embodiment.

FIG. 5 is a flowchart of an operation sequence of computer terminal 10A in the sequence diagram of FIG. 3. Computer terminal 10A accepts the input of an action for registering user B in the contact list (S101), tentatively registers user B (S102), sends "registration request" (S13 in FIG. 3) to presence service server 20 (S103), and waits for "registration response" (S22 in FIG. 3) and "registration request" (S23 in FIG. 3) from presence service server 20 (S104). When computer terminal 10A receives "registration response" (S22 in FIG. 3) (S105), computer terminal 10A determines whether or not the "registration response" represents "OK" (S106). If the "registration response" does not represent "OK", then computer terminal 10A performs a rollback process to cancel the process of tentatively registering user B (S110). If the "registration response" represents "OK", then when computer terminal 10A receives "registration request" (S23 in FIG. 3) (S107), computer terminal 10A returns "registration response (OK)" in step S14 in FIG. 3 without seeking a confirmation from user A (S108), and fully registers user B (S109).

Figure 6:
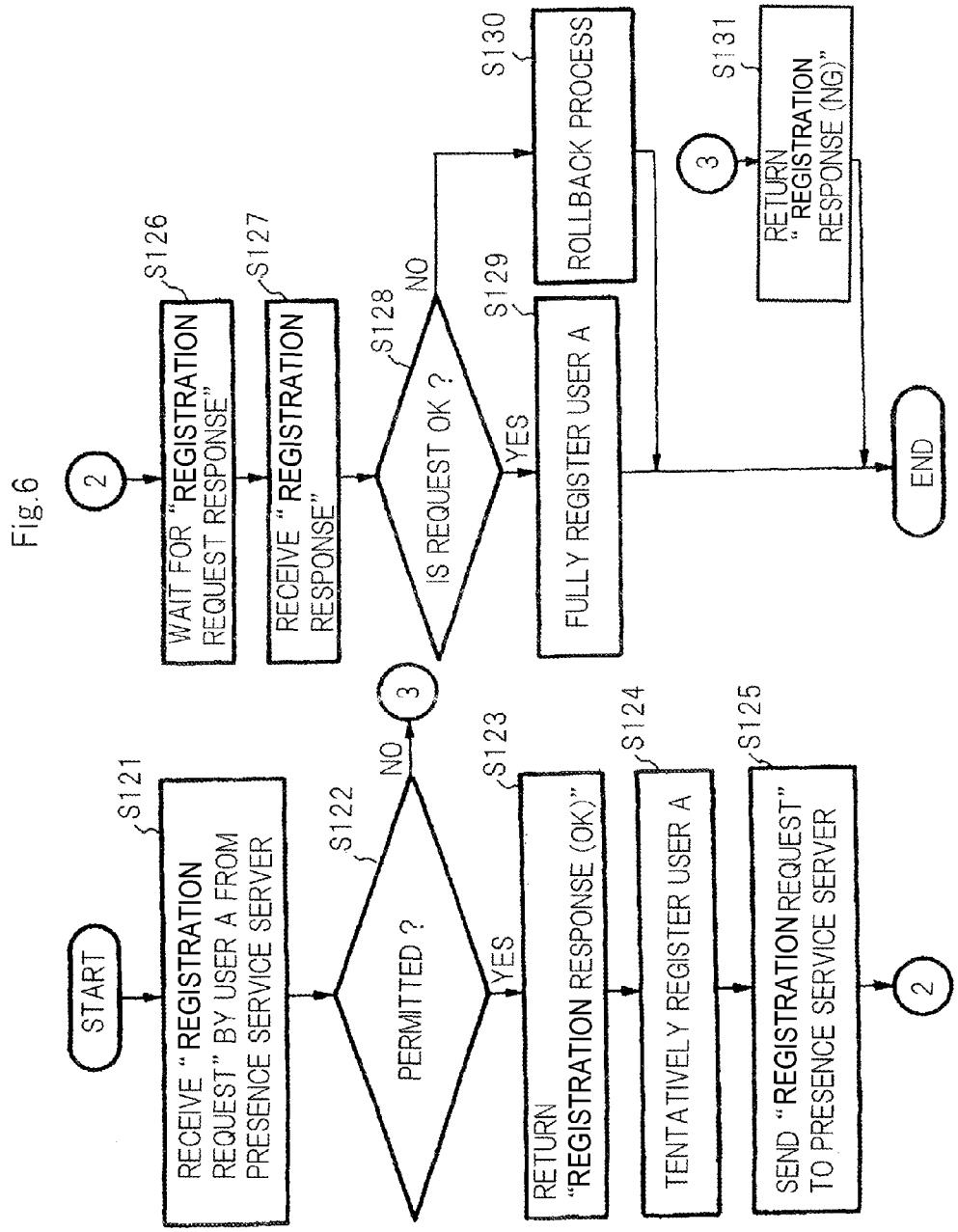
FIG. 6 is a flowchart of an operation sequence of a computer terminal in the process of registering a user in a contact list according to the first exemplary embodiment.

FIG. 6 is a flowchart of an operation sequence of computer terminal 10B in the sequence diagram of FIG. 3. Computer terminal 10B receives "registration request" (S21 in FIG. 3) (S121), and selects whether or not the "registration request" is "permitted" (S122). If "permitted" is selected (S122) (YES), computer terminal 10B returns "registration response (OK)" (S32 in FIG. 3) (S123), tentatively registers user A (S124), and sends "registration request" (S34 in FIG. 3) to presence service server 20 (S125).

When computer terminal 10B receives "registration request" (S21 in FIG. 3), if "not permitted" is selected for the "registration request" in step S122 (NO), computer terminal 10B returns "registration response (NG)" (S131).

When computer terminal 10B receives "registration response" (S24 in FIG. 3), computer terminal 10B determines whether or not the "registration response" is OK (S128). If the "registration response" is OK (YES), then computer terminal 10B fully registers user A (S129).

IF the "registration response" is not OK in step S128 (NO), then computer terminal 10B performs a rollback process of canceling the tentative registration of user A (S130).

Figure 7:
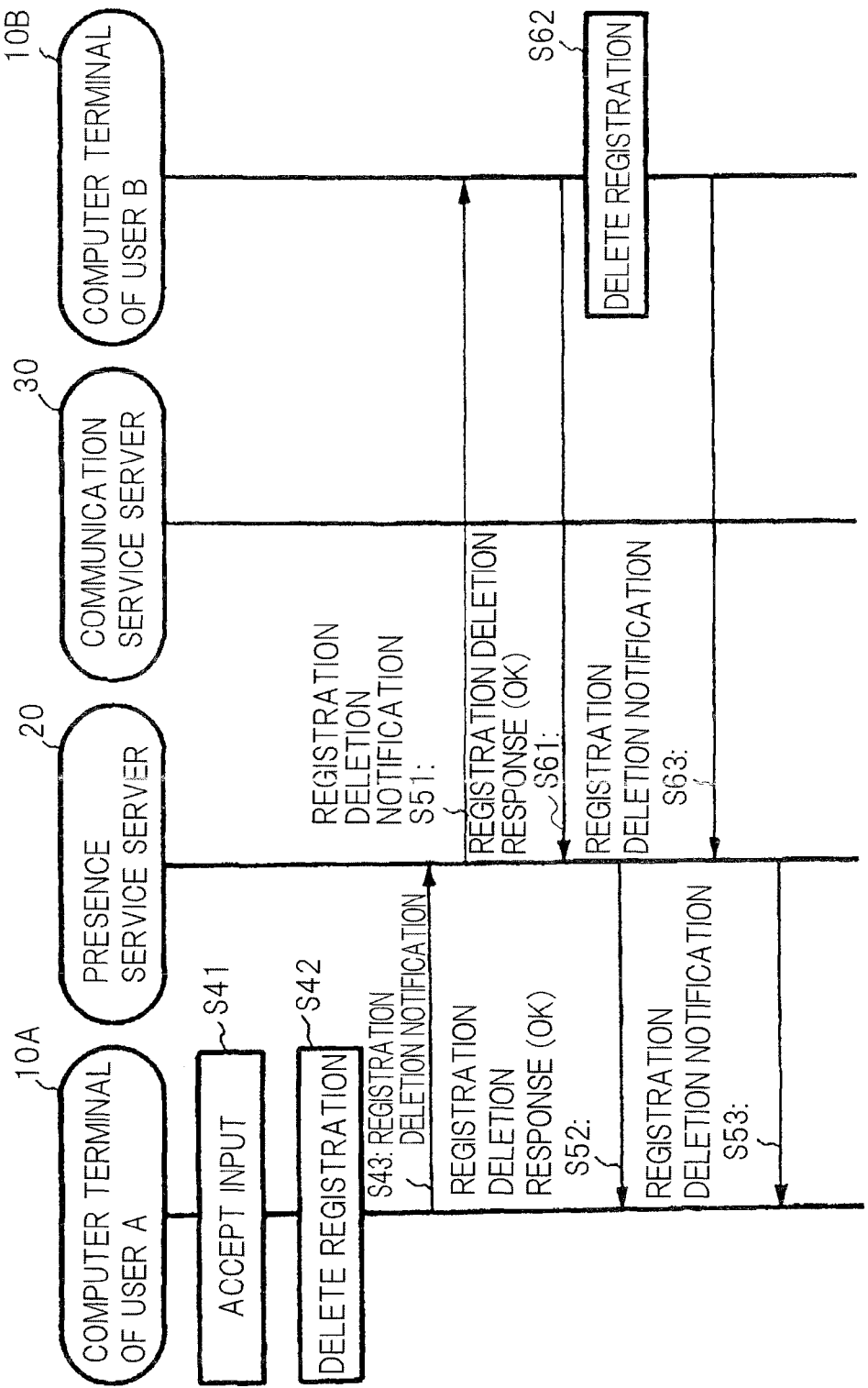
FIG. 7 is a sequence diagram of a process of deleting the registration of a user from a contact list according to the first exemplary embodiment.

FIG. 7 is a sequence diagram of a process of deleting the registration of a user from a contact list. In FIG. 7, computer terminal 10A accepts an input to delete the registration of user B from the contact list (S41). Then, computer terminal 10A deletes the registration of user B from the contact list (S42). Specifically, input means 107A indicates to contact list managing means 104A that there is an action to delete user B from the contact list, and contact list managing means 104A deletes the registration of user B from the contact list that is stored in contact list storage means 105A. Then, contact list managing means 104A changes "presence disclosure state with user B" stored in contact list storage means 105A from "permitted state" back to "initial state".

After deleting the registration of user B from the contact list, computer terminal 10A sends "registration deletion notification" for user B to presence service server 20 without the need for an action of user A (S43). Specifically, after the process performed by contact list managing means 104A, presence information control means 102A sends "registration deletion notification" for user B to presence service server 20 via communication means 101A.

Presence service server 20 transfers the received "registration deletion notification" to computer terminal 10B of user B (S51).

Computer terminal 10B of user B which has received the "registration deletion notification" returns "registration deletion response (OK)" to presence service server 20 without the need for an action of user B (S61). Then, computer terminal 10B deletes the registration of user A from the contact list without the need for an action of user B (S62). Specifically, presence information control means 102B which has received the "registration deletion notification" via communication means 101B automatically returns "registration deletion response (OK)" to presence service server 20 without seeking confirmation from the user. Then, contact list managing means 104B deletes the registration of user A from the contact list stored in contact list storage means 105B. Contact list managing means 104B then changes "presence disclosure state with user A" stored in contact list storage means 105B from "permitted state" back to "initial state".

Furthermore, computer terminal 10B sends "registration deletion notification" for user A to presence service server 20 (S63). Specifically, presence information control means 102B sends "registration deletion notification" for user A to presence service server 20 via communication means 101A. In this case, when computer terminal 10B deletes the registration of user A from the contact list, computer terminal 10B may control screen output means 106B to display a message indicating that user A is deleted from the contact list, letting user B know that user A is deleted from the contact list.

Presence service server 20 transfers the received "registration deletion response (OK)" and "registration deletion notification" to computer terminal 10A (S52, S53).

In FIG. 7, the registration deleting process (S42) of computer terminal 10A may be performed immediately after it has sent "registration deletion notification" (S43), or immediately after it has received "registration deletion response (OK)" (S52), or immediately after it has received "registration deletion notification" (S53). The registration deleting process (S62) of computer terminal 10B may be performed immediately after it has received "registration deletion notification" (S51) or immediately after it has sent "registration deletion notification" (S63).

In FIG. 7, the "registration deletion response (OK)" may be dispensed with. This is because with respect to the action of user A to delete the registration of user B, no confirmation is required from user B and NG is not returned from computer terminal 10B, and also because it is possible to confirm that "registration deletion notification" has reached computer terminal 10B by receiving "registration deletion notification" (S53).

Figure 8:
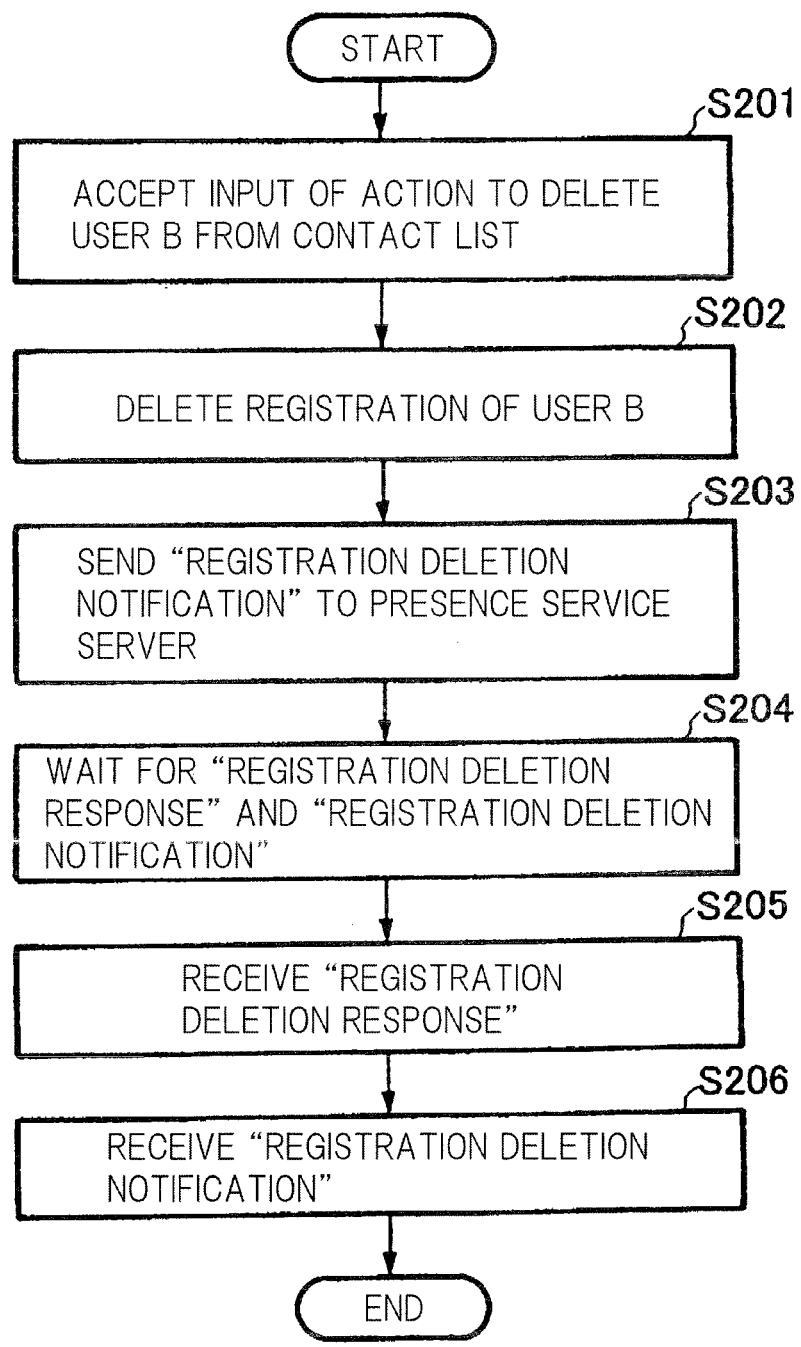
FIG. 8 is a flowchart of an operation sequence of a computer terminal in the process of deleting the registration of a user from a contact list according to the first exemplary embodiment.

FIG. 8 is a flowchart of an operation sequence of computer terminal 10A in the sequence diagram of FIG. 7. When computer terminal 10A accepts the input of an action for deleting user B in the contact list (S201), computer terminal 10A deletes the registration of user B (S202), and thereafter sends "registration deletion notification" for user B to presence service server 20 (S203). Thereafter, computer terminal 10A waits for "registration deletion response" (S52 in FIG. 7) and "registration deletion notification" (S53 in FIG. 7) from presence service server 20 (S204), receives "registration deletion response" (S205), and then receives "registration deletion notification" (S206).

Figure 9:
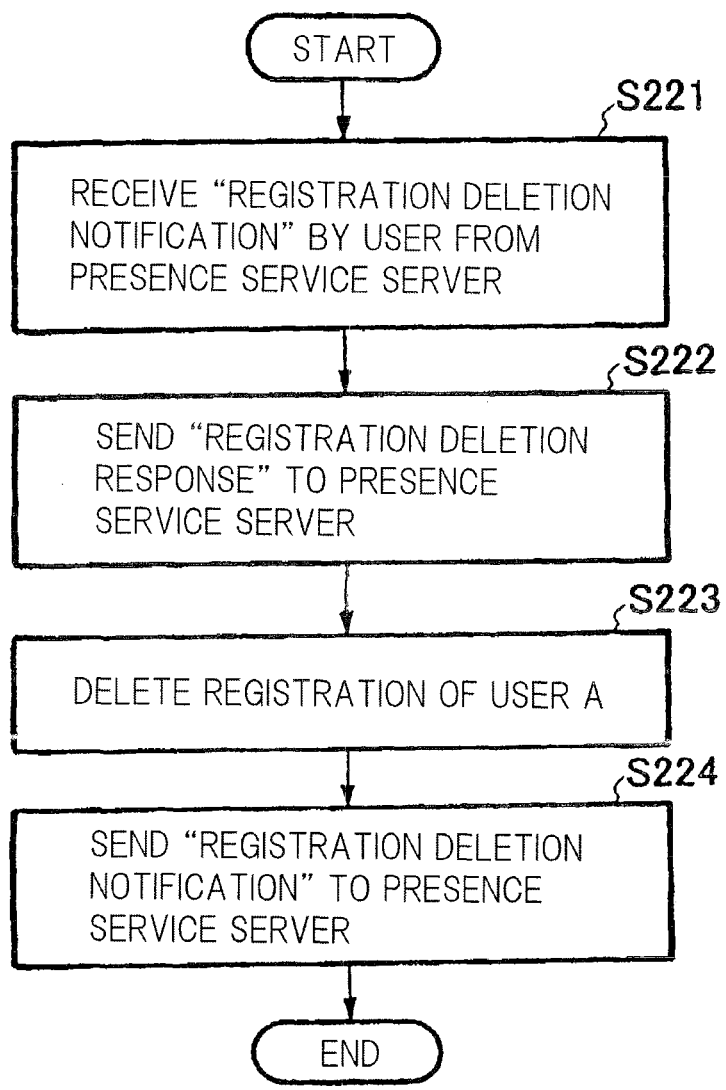
FIG. 9 is a flowchart of an operation sequence of a computer terminal in the process of deleting the registration of a user from a contact list according to the first exemplary embodiment.

FIG. 9 is a flowchart of an operation sequence of computer terminal 10B in the sequence diagram of FIG. 7. When computer terminal 10B receives "registration deletion notification" (S51 in FIG. 7) (S221), computer terminal 10B sends "registration deletion response" to presence service server 20 without the need for an action of user A (S222). Thereafter, computer terminal 10B deletes the registration of user A (S223), and sends "registration deletion notification" (S63 in FIG. 7) for user A via presence service server 20 (S224).

Figure 10:
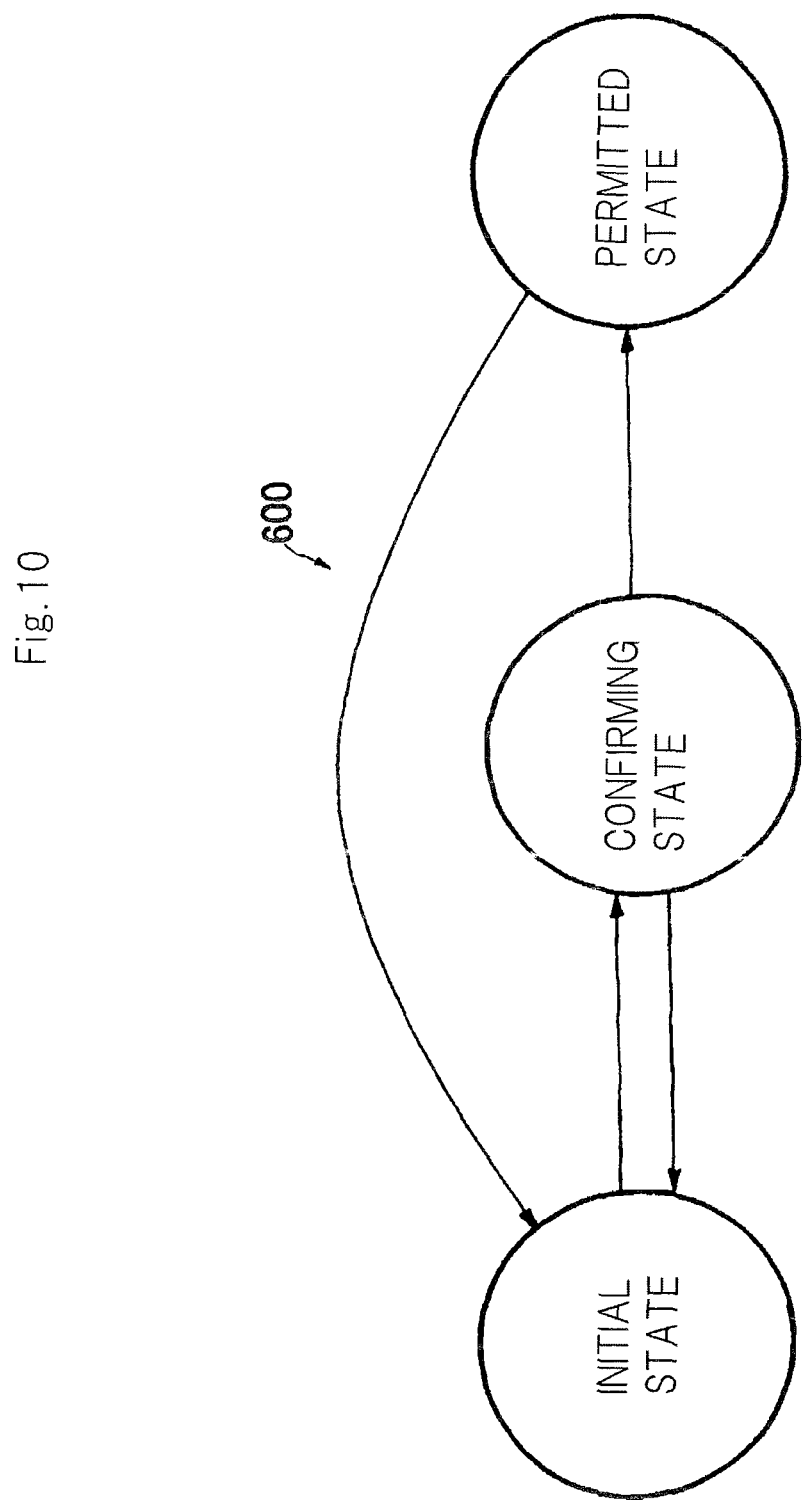
FIG. 10 is a diagram showing a state transition of presence disclosure information according to the first exemplary embodiment.

FIG. 10 is a diagram showing a state transition of the presence disclosure state. The presence disclosure state transits from "initial state" through "confirming state" to "permitted state". If the presence disclosure state does not transit from "confirming state" to "permitted state", then the presence disclosure state changes back to "initial state". When the registration of a user is deleted from the contact list, the presence disclosure state changes from "permitted state" back to "initial state".

The general interactive communication systems using a presence technology do not incorporate the concept of changing the "permitted" state back to the initial state for a user who has been permitted to disclose presence information and to receive an instant message. Therefore, the "permitted" state has to remain unchanged or has to change to a "refused" state for a user who has been permitted.

Therefore, such interactive communication systems using the above presence technology cannot be used to cancel the permission, change back to the initial relationship, and request permission when it is required again for a user who has been permitted to disclose presence information and to receive an instant message.

Particularly, since the "refused" state is usually based on the assumption that unknown users and malicious users should be blocked, a user who has been set to the "refused" state is unaware of being refused, and has the presence information of a companion displayed as unavailable at all times or is not allowed to request permission again. Such a problem does not occur according to the present invention wherein the "permitted state" changes back to the "initial state" when the registration of a user is deleted.

According to the present exemplary embodiment, as described above, when user B is registered in the contact list of computer terminal 10A, user A is registered in the contact list of computer terminal 10B by presence information control means 102A, 102B, contact list managing means 104A, 104B, and contact list storage means 105A, 105B. Consequently, the state wherein user A fails to be registered in the contact list of computer terminal 10B, whereas user B is registered in the contact list of computer terminal 10A is avoided. The users are always mutually registered in their contact lists.

According to the present exemplary embodiment, communication control means 103A, 103B, contact list managing means 104A, 104B, and contact list storage means 105A, 105B make it possible to disclose presence information and perform interactive communications between users who are registered in the contact lists that are stored in contact list storage means 105A, 105B. Consequently, the users registered in the contact lists, the users who disclose presence information, and the users who are capable of performing interactive communications can be held in conformity with each other. All users who are permitted to disclose presence information, receive instant messages, and receive other mediums can be confirmed from only the contact lists.

According to the present exemplary embodiment, furthermore, when user B or user A is to be deleted from the contact list of computer terminal A or computer terminal B, contact list managing means 104A, 104B, contact list storage means 105A, 105B, and presence information control means 102A, 102B send a registration deletion notification to computer terminal 10B or computer terminal 10A to delete user B or user A from the contact list of computer terminal A or computer terminal B. Consequently, the state wherein user A remains registered in the contact list of computer terminal 10B, whereas user B is deleted from the contact list of computer terminal 10A is avoided.

Second Exemplary Embodiment

Figure 11:
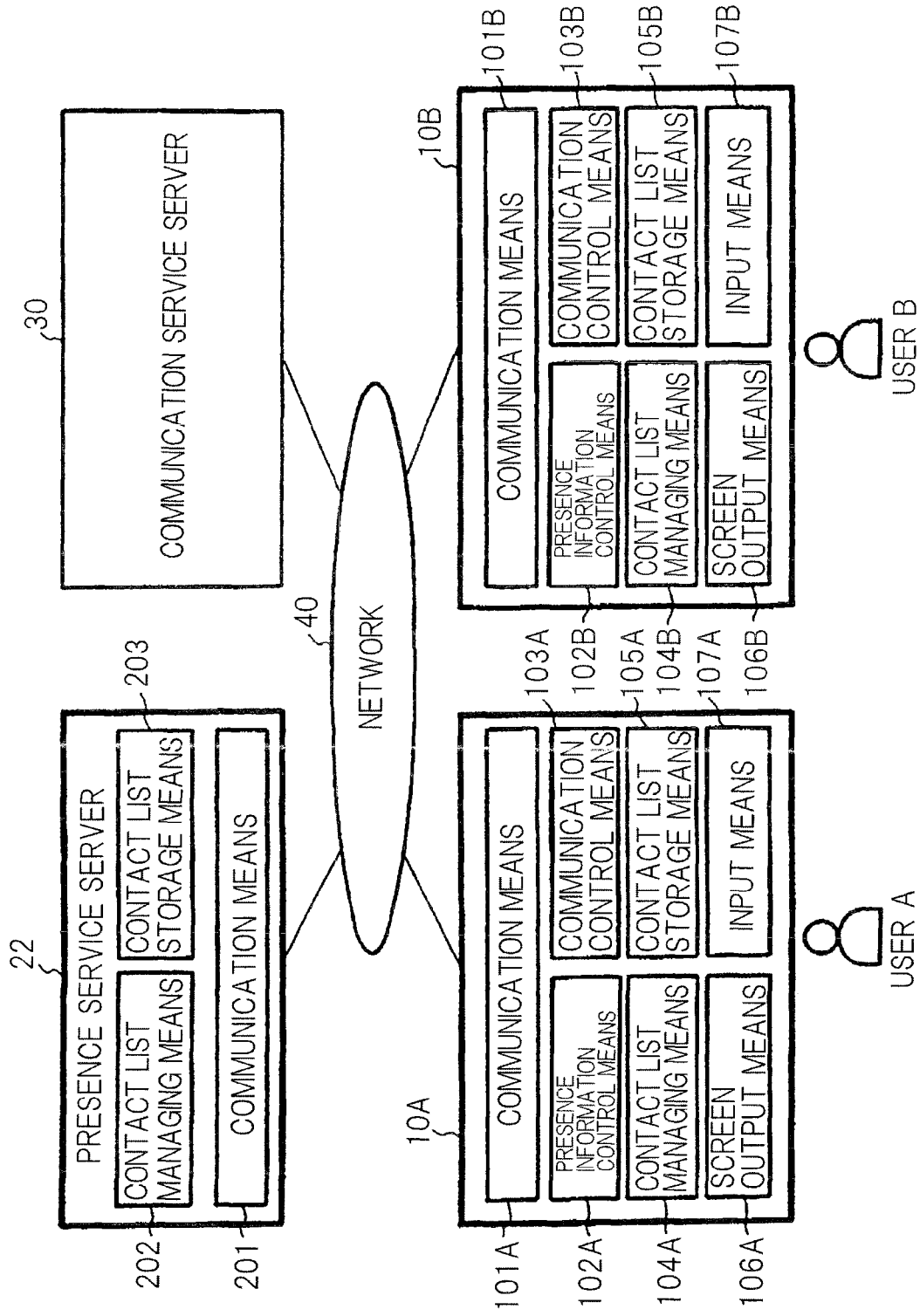
FIG. 11 is a block diagram showing the system configuration of an interactive communication system according to a second exemplary embodiment of the present invention.

The best mode for carrying out a second invention will be described in detail below with reference to the drawings. FIG. 11 is a block diagram showing the system configuration of an interactive communication system according to a second exemplary embodiment of the present invention.

As shown in FIG. 11, the interactive communication system according to the present exemplary embodiment comprises computer terminals 10A, 10B which operate under program control, presence service server 22, communication service server 30, and network 40. Computer terminals 10A, 10B and communication service server 30 are identical in configuration to those of the first exemplary embodiment.

Presence service server 22 is different from the presence service server according to the first exemplary embodiment in that it includes communication means 201, contact list managing means 202, and contact list storage means 203.

Communication means 201 communicates with computer terminal 10A and computer terminal 10B via network 40.

Contact list managing means 202 manages contact lists and presence disclosure state tables for user A and user B so as to be stored in contact list storage means 203.

Contact list storage means 203 stores the contact lists and the presence disclosure state tables for user A and user B.

Overall operation of the interactive communication system according to the present exemplary embodiment will be described in detail below with reference to sequence diagrams of FIGS. 12 and 13.

Figure 12:
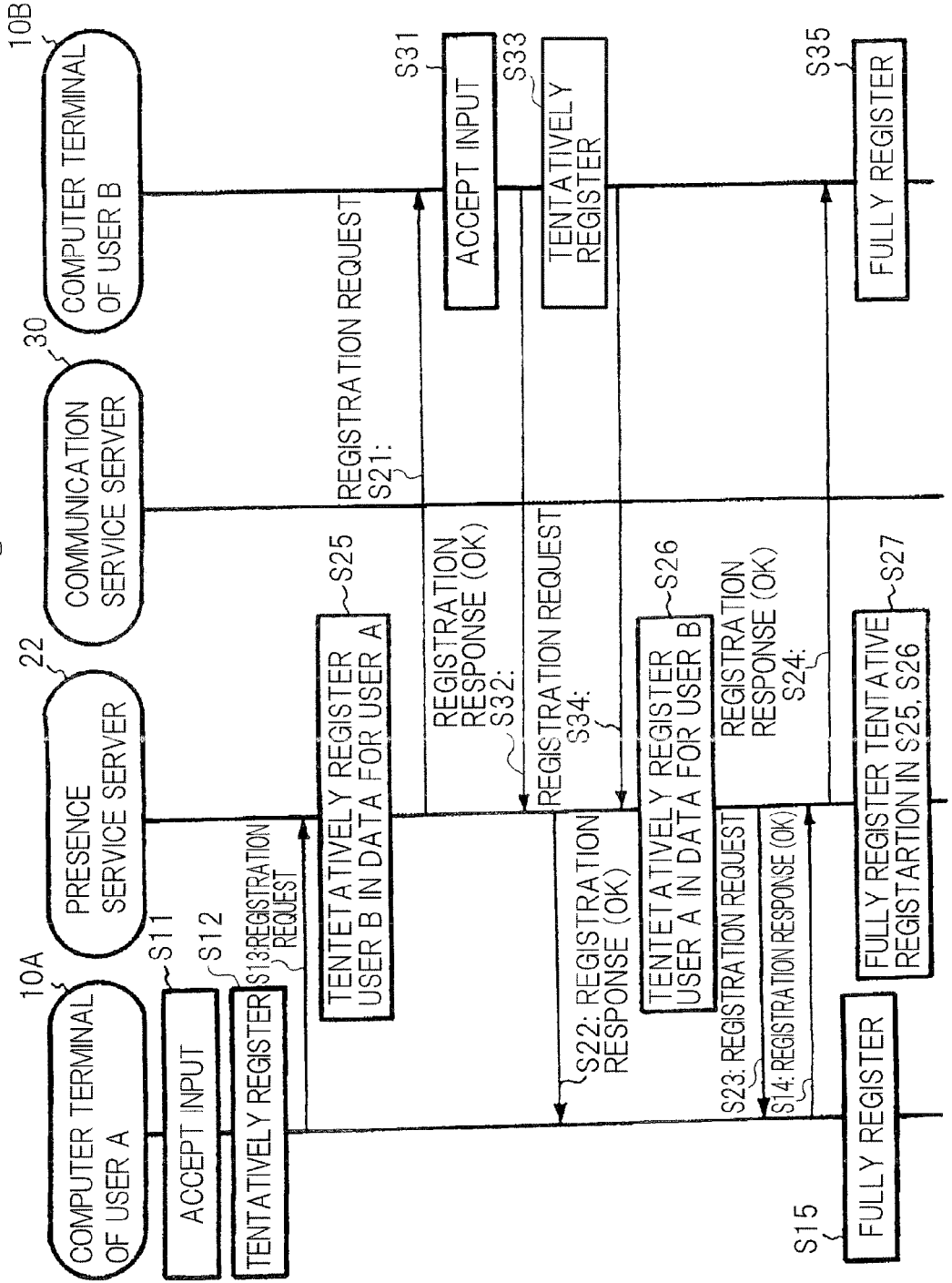
FIG. 12 is a sequence diagram of a process of registering a user in a contact list according to the second exemplary embodiment.

FIG. 12 is a sequence diagram of a process of registering a user in a contact list. In FIG. 12, computer terminal 10A accepts the input of an action for registering user B in the contact list (S11). Then, computer terminal 10A tentatively registers user B (S12). Furthermore, computer terminal 10A sends "registration request" for user B to presence service server 22 (S13).

When presence service server 22 receives the "registration request" issued from computer terminal 10A, presence service server 22 tentatively registers user B in the data for user A (S25). Specifically, when contact list managing means 202 receives the "registration request" via communication means 201, contact list managing means 202 changes "presence disclosure state with user B" in the presence disclosure information table for user A stored in contact list storage means 203 from "initial state" to "confirming state".

Then, presence service server 22 transfers the "registration request" to computer terminal 10B (S21).

Computer terminal 10B which has received the "registration request" issued from computer terminal 10A displays on the screen a message indicating that there is a registration request from user A for registration in the contact list. Computer terminal 10B accepts an input from user B with respect to a selection as to whether or not the registration request is to be permitted (S31). When computer terminal 10B accepts the input of "permitted" from user B, computer terminal 10B returns "registration response (OK)" to presence service server 22 (S32).

Presence service server 22 transfers the received "registration response (OK)" to computer terminal 10A (S22).

Thereafter, computer terminal 10B tentatively registers user A (S33). Then, computer terminal 10B sends "registration request" for user A to presence service server 22 (S34).

When presence service server 22 receives the "registration request" issued from computer terminal 10B, presence service server 22 tentatively registers user A in the data for user B (S26). Specifically, when contact list managing means 202 receives the "registration request" via communication means 201, contact list managing means 202 changes "presence disclosure state with user A" in the presence disclosure information table for user B stored in contact list storage means 203 from "initial state" to "confirming state".

Presence service server 22 transfers the "registration request" to computer terminal 10A of user A (S23).

When computer terminal 10A of user A receives the "registration response (OK)" (S22) and the "registration request" (S23) from presence service server 22, computer terminal 10A returns "registration response (OK)" to the "registration request" (S23) to presence service server 22 (S14). Thereafter, computer terminal 10A fully registers user B (S15).

Presence service server 22 transfers the received "registration response (OK)" to computer terminal 10B (S24), and fully registers user B in the data for user A and user A in the data for user B (S27). Specifically, when contact list managing means 202 receives the "registration response (OK)" (S14) from computer terminal 10A via communication means 201, contact list managing means 202 changes "presence disclosure state with user B" stored for user A in contact list storage means 203 from "confirming state" to "permitted state", and fully registers user B in the data for user A. At the same time, contact list managing means 202 changes "presence disclosure state with user A" stored for user B in contact list storage means 203 from "confirming state" to "permitted state", and fully registers user A in the data for user B.

In FIG. 12, the process of tentatively registering user B in the data for user A (S25) and the sending of the "registration request" (S21) may be switched around. The process of tentatively registering user A in the data for user B (S26) and the sending of the "registration request" (S23) may also be switched around. The sending of the "registration response (OK)" (S24) and the process of "fully registering the tentative registration in S25 and S26" (S27) may also be switched around. Of the process of "fully registering the tentative registration in S25 and S26" (S27), the process of "fully registering the tentative registration in S25" may be carried out at the timing of S26. Switching these steps around may only result in a change in a process to be performed if an error occurs in the sequence for some reasons.

Figure 13:
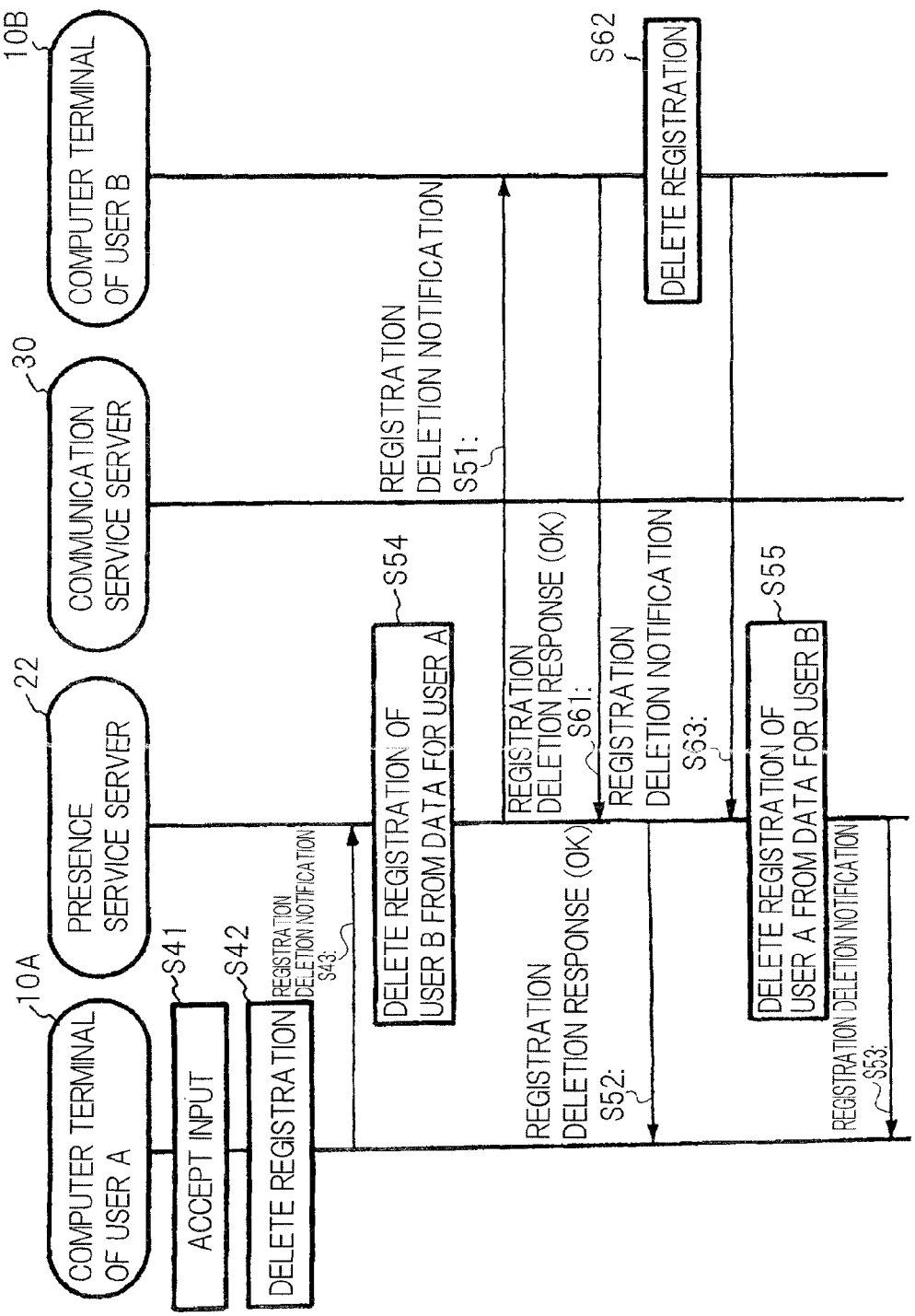
FIG. 13 is a sequence diagram of a process of deleting the registration of a user from a contact list according to the second exemplary embodiment.

FIG. 13 is a sequence diagram of a process of deleting the registration of a user from a contact list. In FIG. 13, computer terminal 10A accepts an input to delete the registration of user B from the contact list (S41). Then, computer terminal 10A deletes the registration of user B from the contact list (S42). Furthermore, computer terminal 10A sends "registration deletion notification" for user B to presence service server 22 (S43).

When presence service server 22 receives the "registration deletion notification" issued from computer terminal 10A, presence service server 22 deletes the registration of user B from the data for user A (S54). Specifically, when contact list managing means 202 receives the "registration deletion notification" via communication means 201, contact list managing means 202 deletes the registration of user B from the data for user A stored in contact list storage means 203, and changes "presence disclosure state with user B" in the presence disclosure information table for user A stored in contact list storage means 203 from "permitted state" to "initial state".

Presence service server 22 transfers the "registration deletion notification" to computer terminal 10B (S51).

Computer terminal 10B which has received the "registration deletion notification" returns "registration deletion response (OK)" to presence service server 22 without the need for an action of user B (S61). Then, computer terminal 10B deletes the registration of user A (S62). Furthermore, computer terminal 10B sends "registration deletion notification" for user A to presence service server 22 (S63).

When presence service server 22 receives the "registration deletion notification" issued from computer terminal 10B, presence service server 22 deletes the registration of user A from the data for user B (S55). Specifically, when contact list managing means 202 receives the "registration deletion notification" via communication means 201, contact list managing means 202 deletes the registration of user A from the data for user B stored in contact list storage means 203, and changes "presence disclosure state with user A" in the presence disclosure information table for user B stored in contact list storage means 203 from "permitted state" to "initial state".

Presence service server 22 transfers the received "registration deletion notification" to computer terminal 10A (S53).

In this manner, the contact list and the presence disclosure information table which are stored in presence service server 22 are synchronized with the contact list and the presence disclosure information table which are stored in computer terminals 10A, 10B.

In FIG. 13, the process of deleting the registration of user B from the data for user A (S54) and the sending of "registration deletion notification" (S51) may be switched around. The process of deleting the registration of user A from the data for user B (S55) and the sending of "registration deletion notification" (S53) may also be switched around.

According to the present exemplary embodiment, as described above, since the contact list and the presence disclosure information table which are stored in each computer terminal are synchronously stored in presence service server 22, each computer terminal can acquire the contact list and the presence disclosure information table from presence service server 22 when necessary. Consequently, a user can acquire the contact list and the presence disclosure information table from presence service server 22 and use them even when the user has changed to a different computer terminal used.

The system administrator can preset the contact lists of users. For example, if the system administrator has rewritten the contact list of each user who is stored in presence service server 22, then when computer terminal 10A or 10B is connected to presence service server 20, it can acquire the rewritten contact list of its own from presence service server 22 and use it.

In the above first and second exemplary embodiments, presence service servers 20, 21 or communication service server 30 may be installed in a physically single server or may be distributed in physically plural servers for operation.

Presence service servers 20, 21 or communication service server 30 may be installed in a computer which is physically the same as computer terminal 10A or computer terminal 10B.

In the first and second exemplary embodiments, when computer terminal 10B receives the "registration request" issued from computer terminal 10A (S21 in FIG. 3 or FIG. 10), computer terminal 10B may select not only "permitted" or "not permitted", but also "always refused". In this case, when computer terminal 10B returns "registration response (NG)" (S131), computer terminal 10B includes a parameter for identifying "always refused" in the "registration response (NG)". Furthermore, computer terminal 10B manages the presence disclosure state so as to include at least three values representing "initial state", "permitted state", and "always refused", and records "presence disclosure state with user A" as "always refused state".

In the first and second exemplary embodiments, when presence service server 20 or 21 receives "registration response (NG)" including "always refused", presence service server 20 or 21 may store a policy indicating that "user B always refuses user A". For example, while presence service server 20 or presence service server 21 is storing a policy indicating that "user B always refuses user A", if presence service server 20 or presence service server 21 receives "registration request" for registering user B in the contact list of computer terminal 10A (S13), presence service server 20 or presence service server 21 judges the "registration request" as NG and returns "registration response (NG)" to computer terminal 10A. The setting of "always refused" may be canceled by the user who has set "always refused".

In the first and second exemplary embodiments, furthermore, a function to authenticate a user may be added to presence service server 20 or presence service server 21 and communication service server 30. For example, when user A uses computer terminal 10A to start using presence service server 20 or presence service server 21 and communication service server 30, user A logs in presence service server 20 or presence service server 21 and communication service server 30, using a user ID and a password which have been pre-registered. The user ID and the password may be a user ID and password that have been recorded in a directory system which is present as another system in a company. The user ID may be an electronic mail address of the user, a telephone number of the user, or the like.

In the first and second exemplary embodiments, moreover, communications through network 40 may be encrypted. Specifically, communications between computer terminal 10A and presence service server 20 or presence service server 21, communications between computer terminal 10A and communication service server 30, communications between computer terminal 10B and presence service server 20, and communications between computer terminal 10B and communication service server 30 are encrypted. Depending on the type of interactive communications, communication service server 30 is initially involved and thereafter direct communications are performed between computer terminal 10A and computer terminal 10B. In such a case, communications between computer terminal 10A and computer terminal 10B may be encrypted. There may be a situation in which communications are required between presence service server 20 or 21 and communication service server 30. In such a case, communications between presence service server 20 or 21 and communication service server 30 may be encrypted.

The encryption process may employ IPsec (Security Architecture for Internet Protocol), TLS (Transport Layer Security), SRTP (Secure RTP), or the like.

Third Exemplary Embodiment

Figure 14:
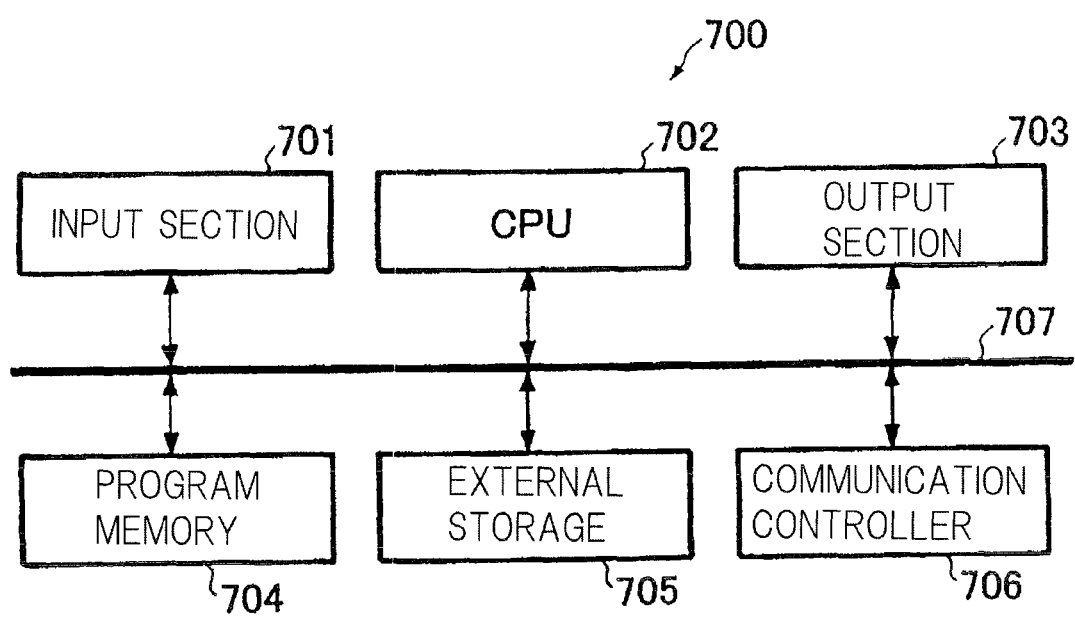
FIG. 14 is a diagram showing the configuration of a computer according to a third exemplary embodiment which operates under a program that represents the first and second exemplary embodiments of the present invention.

A third exemplary embodiment of the present invention will be described in detail below with reference to the drawings. According to the present exemplary embodiment, the first and second exemplary embodiments of the present invention are incorporated in a program. FIG. 14 is a diagram showing the configuration of a computer which operates under the program. As shown in FIG. 14, computer 700 comprises input section 701, CPU 702, output section 703, program memory 704, external storage 705, and communication controller 706 which are connected to bus 707.

According to the present exemplary embodiment, the program is read into computer 700 and controls operation of computer 700. Computer 700 is controlled by the program to perform a process which is the same as the process performed by computer terminals 10A, 10B and presence service server 22 according to the second exemplary embodiment.

In the first exemplary embodiment, for example, contact list storage means 105A, 105B of computer terminals 10A, 10B are implemented by external storage 705.

In the second exemplary embodiment, contact list storage means 105A, 105B of computer terminals 10A, 10B may not necessarily be implemented by external storage 705, but may be implemented by program memory 704. This is because the contact lists and presence disclosure state tables for user A and user B are stored in presence service server 22, and computer terminals 10A, 10B can acquire the contact lists and presence disclosure state tables from presence service server 22.

The present invention is appropriately applicable to applications such as business communications represented by quick interactive communications between only limited companions such as supervisors, subordinates, project members, etc. in business environments, and is also applicable to communications in business-oriented telework environments between remote locations.

The present invention has been described above in reference to the exemplary embodiments. However, the present invention is not limited to the above exemplary embodiments. Rather, various changes that can be understood by those skilled in the art within the scope of the invention may be made to the arrangements and details of the present invention.

The present application claims priority based on Japanese patent application No. 2008-6887 filed on Jan. 16, 2008, and incorporates herein the entire disclosure thereof by reference.

The invention claimed is:

1. An interactive communication system including a plurality of computer terminals connected to a presence service server and a communication service server through a network, said computer terminals having respective contact lists of communicable users, for performing communications between computer terminals belonging to users registered in said contact lists via said network, said presence service server, and said communication service server, wherein each of said computer terminals comprises:

contact list storage device for storing a presence disclosure state table representative of whether presence information indicating the availability or unavailability of a second user is to be disclosed to a first user operating said computer terminal, and also storing the contact list;

a processor configured to operate as:

presence information controller for exchanging a request for registering or deleting a user in said contact list with a second computer terminal operated by said second user via said presence service server; and contact list manager for managing said contact list and said presence disclosure state table, exchanging the request for registering or deleting the second user in said contact list to said second computer terminal via said presence information controller, waiting for a response to said request from said second computer terminal, and completing the registration or deletion of the second user in said contact list and providing permission to the second computer terminal to register or delete the first user in a contact list of the second user and a presence disclosure state table of the second user; and communication controller for disclosing said presence information to and performing interactive communications with only those users registered in said contact list.

2. The interactive communication system according to claim 1, wherein said presence service server comprises:

contact list storage device for storing the contact list and the presence disclosure state table of each of the users of said computer terminals; and a processor configured to operate as contact list manager for managing said contact list and said presence disclosure state table which are stored in said contact list storage, and allowing each of the users to acquire said contact list and said presence disclosure state table from said presence service server.

3. The interactive communication system according to claim 2, wherein said contact list manager manages the contact list and the presence disclosure state table which are stored in said contact list storage device such that said computer terminals can acquire the contact list and the presence disclosure state table.

4. The interactive communication system according to claim 1, wherein at least one from among SIP (Session Initiation Protocol), SIMPLE (SIP for Instant Messaging and Presence Leveraging Extensions), XMPP (eXtensible Messaging and Presence Protocol), and HTTP (Hypertext Transfer Protocol) is used as a protocol between said computer terminals and said presence service server.

5. The interactive communication system according to claim 1, wherein at least one from among mediums including text, audio data, still images, moving images, and electronic files is exchanged by way of interactive communications using said communication service server.

6. The interactive communication system according to claim 1, wherein at least one SIP (Session Initiation Protocol), XMPP (eXtensible Messaging and Presence Protocol), and HTTP (Hypertext Transfer Protocol) is used as a protocol between said computer terminals and said communication service server.

7. The interactive communication system according to claim 1, wherein said presence service server is embodied in said computer terminals.

8. The interactive communication system according to claim 1, wherein said presence service server is distributed among a plurality of presence service servers.

9. The interactive communication system according to claim 1, wherein said communication service server is embodied in said computer terminals.

10. The interactive communication system according to claim 1, wherein said communication service server is distributed among a plurality of communication service servers.

11. The interactive communication system according to claim 1, wherein said presence service server and said communication service server are embodied in said computer terminals.

12. The interactive communication system according to claim 1, wherein each of said computer terminals comprises at least one from among a PC (Personal Computer), a telephone, a mobile phone, a PDA (Personal Digital Assistant), a game machine, and a display with a built-in computer.

13. The interactive communication system according to claim 1, wherein said presence service server has a function to authenticate a user who tries to connect via one of the computer terminals.

14. The interactive communication system according to claim 1, wherein said communication service server has a function to authenticate a user trying to connect via one of the computer terminals.

15. The interactive communication system according to claim 13, wherein the user is authenticated using a user ID and a password.

16. The interactive communication system according to claim 13, wherein said user ID and said password comprise a recorded user ID and a recorded password that have been recorded in a directory system which is present as another system in a company.

17. The interactive communication system according to claim 13, wherein said user ID comprises either an electronic main address of the user or a telephone number of the user.

18. The interactive communication system according to claim 1, wherein cryptography is used for communications between said computer terminals, said presence service server, and said communication service server, and communications between said computer terminals.

19. The interactive communication system according to claim 18, wherein at least one from among IPsec (Security Architecture for Internet Protocol), TLS (Transport Layer Security), and SRTP (Secure RTP) is used as said cryptography.

20. An interactive communication method in a system including a plurality of computer terminals connected to a presence service server and a communication service server through a network, said computer terminals having respective contact lists of communicable users, for performing communications between computer terminals belonging to users registered in said contact lists via said network, said presence service server, and said communication service server, the method comprising:
   accepting an input of information for registering a second user in a respective contact list of a first computer terminal of the plurality of computer terminals;
   sending a registration request to a computer terminal of the second user;
   waiting for a response from the computer terminal of the second user;
   completing a registration of said second user in said respective contact list if a response representative of "permitted" is obtained from the computer terminal of the second user; and
   sending a response representative of "permitted" to said second user for permitting registration of user of the first computer terminal in a respective contact list of said second user.

21. An apparatus comprising
   a contact list storage device for storing a presence disclosure state table representative of whether presence information indicating the availability or unavailability of a first user is to be disclosed to a second user and storing a contact list of communicable users for the apparatus;
   a processor configured to operate as:
      a presence information controller for exchanging a request for registering or deleting the second user in said contact list with a second apparatus via a presence service server though a network; and
      a contact list manager for managing said contact list and said presence disclosure state table, exchanging the request for registering or deleting the second user in said contact list to said second apparatus via said presence information controller, waiting for a response to said request from said second apparatus, and completing the registration or deletion of the second user in said contact list and providing permission to the second apparatus to register or delete the first user in a contact list of the second user and a presence disclosure state table of the second user; and
      a communication controller for disclosing said presence information to and performing interactive communications with only those users registered in said contact list.

* * * * *